(No Model.)

C. A. CONKLIN.
COFFIN FASTENER.

No. 386,691. Patented July 24, 1888.

Witnesses.
Chas. R. Burr.
Thomas Durant.

Inventor.
Charles A. Conklin
by Franck D. Johns,
his Attorney.

UNITED STATES PATENT OFFICE.

CHARLES A. CONKLIN, OF ADRIAN, MICHIGAN.

COFFIN-FASTENER.

SPECIFICATION forming part of Letters Patent No. 386,691, dated July 24, 1888.

Application filed December 10, 1887. Serial No. 257,533. (No model.)

*To all whom it may concern:*

Be it known that I, CHARLES A. CONKLIN, a citizen of the United States, residing at Adrian, in the county of Lenawee and State of Michigan, have invented certain new and useful Improvements in Fastening Devices for Coffins; and I do hereby declare the following to be a full, clear, and exact description of the invention, such as will enable others skilled in the art to which it appertains to make and use the same.

My invention relates to certain improvements in automatic fastening devices for coffins, packing-boxes, or other cases or boxes; and it consists in certain novelty in the construction and arrangement of the same, all of which I will now proceed to point out and describe, reference being had to the accompanying drawings, in which—

Figure 1:
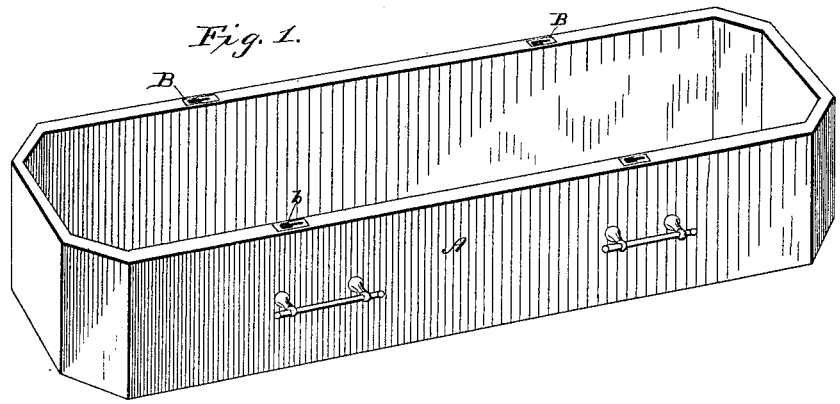
Figure 2:
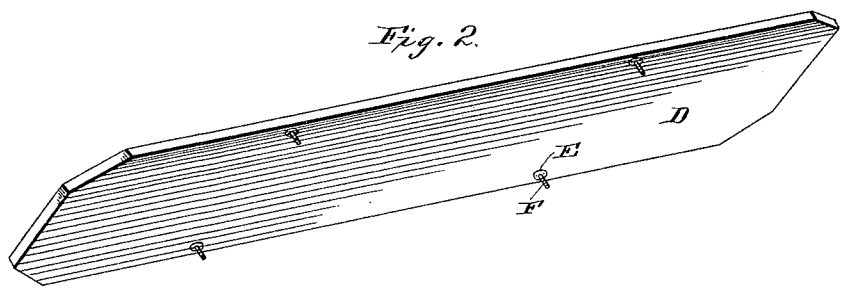
Figure 3:
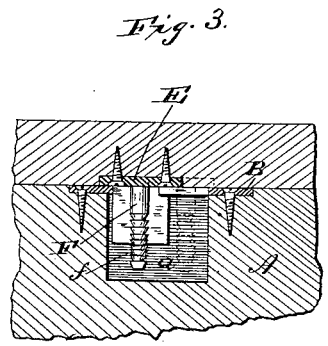
Figure 4:
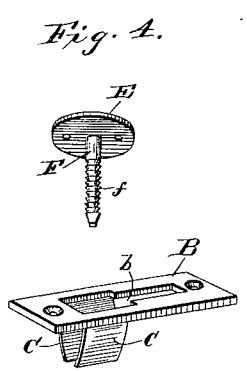
Figure 5:
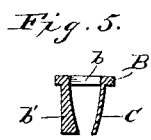

Figure 1 is a perspective of a coffin provided with my improved fastener, the lid being removed. Fig. 2 is a perspective of the under side of the lid provided with my fastener. Fig. 3 is a longitudinal section of one side, the lid being shown secured in position, dotted lines indicating its position when it is desired to remove the same. Fig. 4 is a perspective of the two parts of the fastening device removed from the coffin and lid, and Fig. 5 is a modification of my said invention.

Referring to said drawings, A represents the body of the coffin. In the top edges of the sides I form longitudinal recesses *a*.

B is a metal plate having a longitudinal slot, *b*. This plate is secured over the recesses *a*, so as to be flush with the surface of the top of the sides of the coffin, the slot *b* in the same coming over the recesses *a* and being of the same length as said recesses. Secured to the under side of the plate B, on either side of the slot *b*, are spring catches C C, which extend down into the recesses *a*, but do not reach the bottom of the same. Said catches extend about half the length of the slot *b* and converge toward their lower ends.

D is the lid of the coffin, to the under side of which are secured plates E, corresponding in number to the number of spring-catches on the coffin, and arranged so as to come directly over said catches when placed on said coffin. Projecting from each plate E is a pin or rod, F, provided with notches or ratchet-teeth *f*. When it is desired to secure the lid on the coffin, the same is placed in position, so that the pins F project down between the spring-catches. By forcing the lid down the pins pass between the lower ends of the spring-catches C C, which engage with the notches or ratchet-teeth *f* on the pins or rods and securely fasten said lid in place. When it is desired to remove the lid, it is moved forward, as shown in dotted lines, Fig. 3, thus disengaging the pins from the ratchet-teeth, and the lid can then be removed, the pins coming up through the forward portion of the slots *b*. Instead of two spring catches, one could be used, having opposite to it a downwardly-projecting guide, *b'*, (Shown as a modification in Fig. 5.)

My invention can be used for packing-boxes, cases, or other boxes, as well as for coffins. Any desired number of fastenings may be placed on the coffin or box. In the drawings I have only shown two on each side. My fastener holds the lid down securely at all points and operates equally as well when the lid is warped as when it is in perfect condition.

Having thus fully described my invention, I claim as new and desire to secure by Letters Patent—

A locking device for a coffin or box, consisting of a longitudinal recess in the top of the side of the coffin or box, a longitudinally-slotted plate secured over said recess and provided with a spring-catch extending part of the length of the slot in the plate and extending down into the recess, in combination with a pin secured to the under side of the lid of the coffin or box, and provided with notches or ratchet-teeth adapted to be engaged by the spring-catch when the lid is placed in position, and to be disengaged from said catch when moved longitudinally in the recess, all constructed, arranged and operating substantially as shown and described.

In testimony whereof I affix my signature in presence of two witnesses.

CHARLES A. CONKLIN.

Witnesses:
W. P. STRAIGHT,
R. B. ROBBINS.